May 26, 1953　　　S. F. ANDERSON　　　2,639,677
SANDWICH MACHINE
Filed Dec. 27, 1949　　　　　　　　　　　4 Sheets-Sheet 1
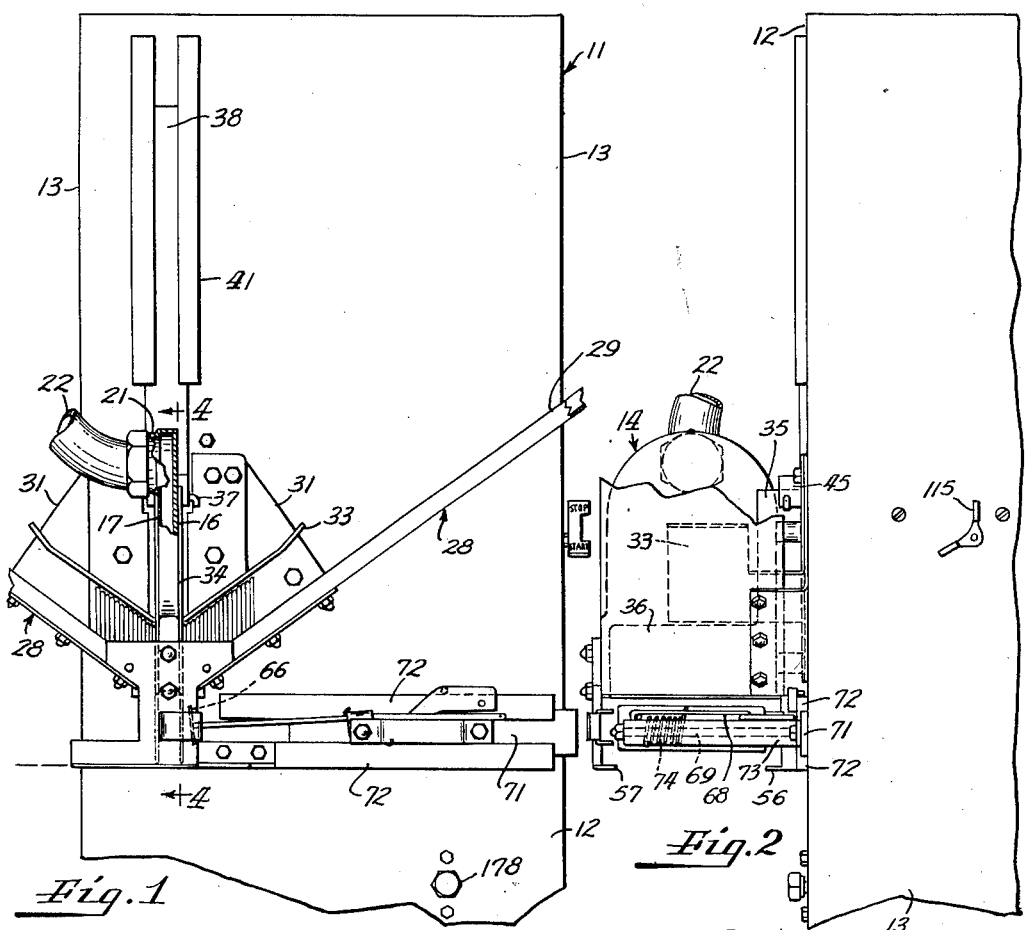
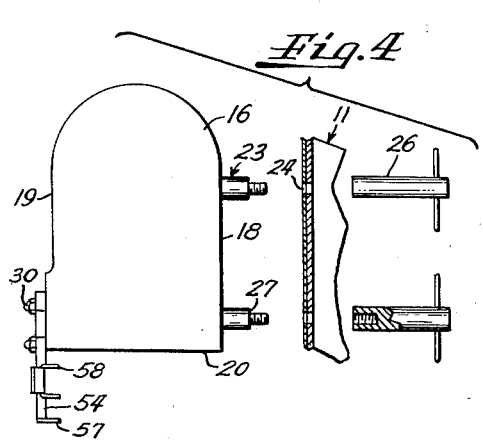
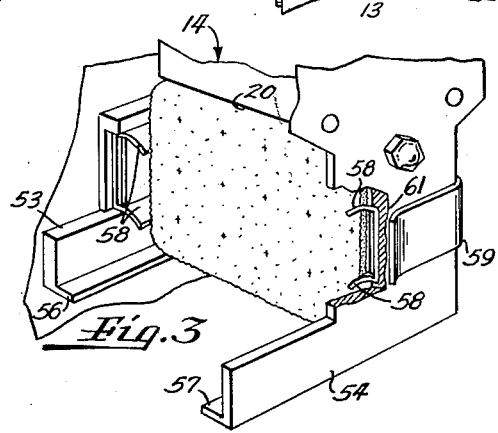
Inventor
Swan F. Anderson
By
McCanna and Morsbach
Attys.

May 26, 1953  S. F. ANDERSON  2,639,677
SANDWICH MACHINE
Filed Dec. 27, 1949  4 Sheets-Sheet 2
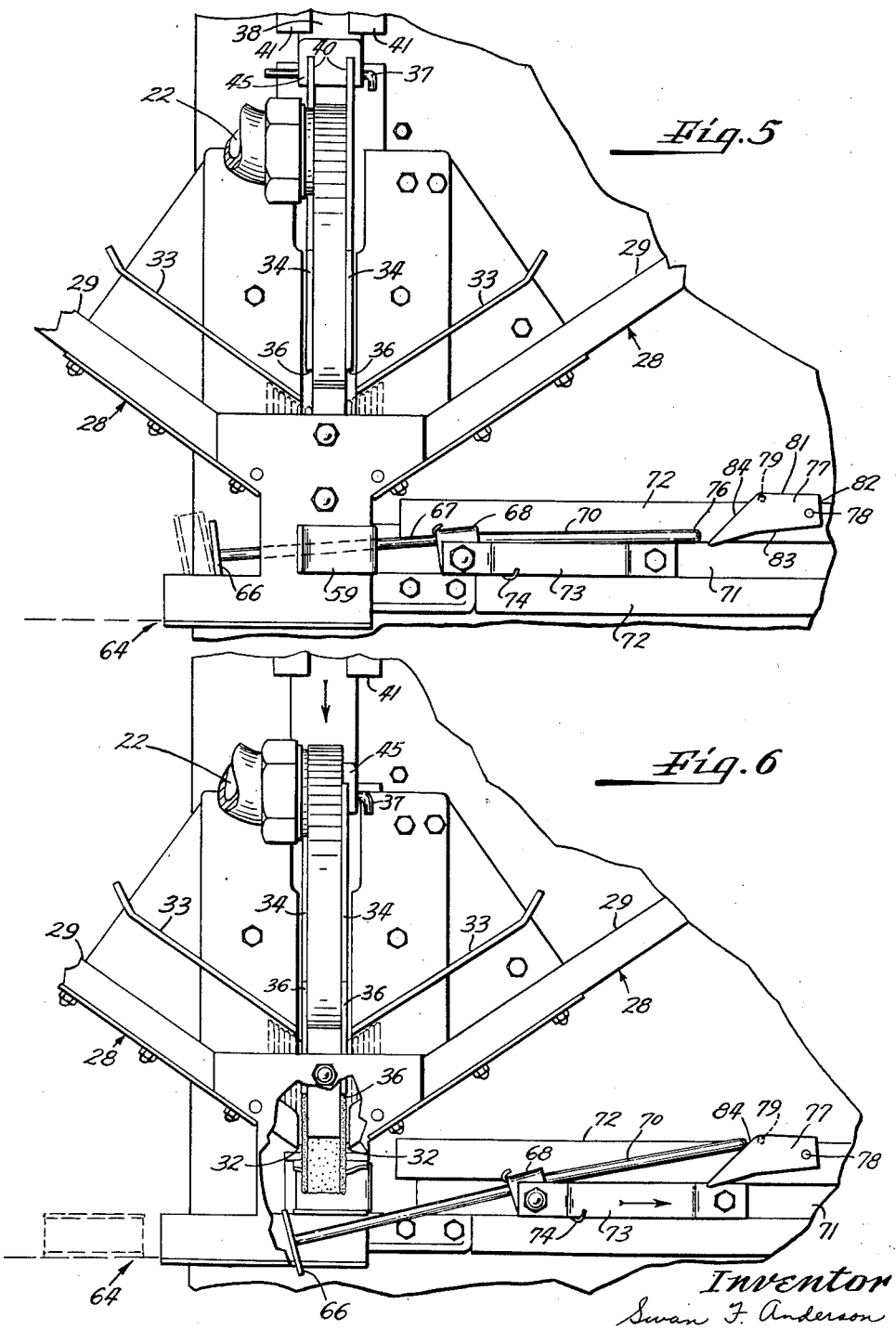
Inventor
Swan F. Anderson
By
McCanna and Morsbach
Attys.

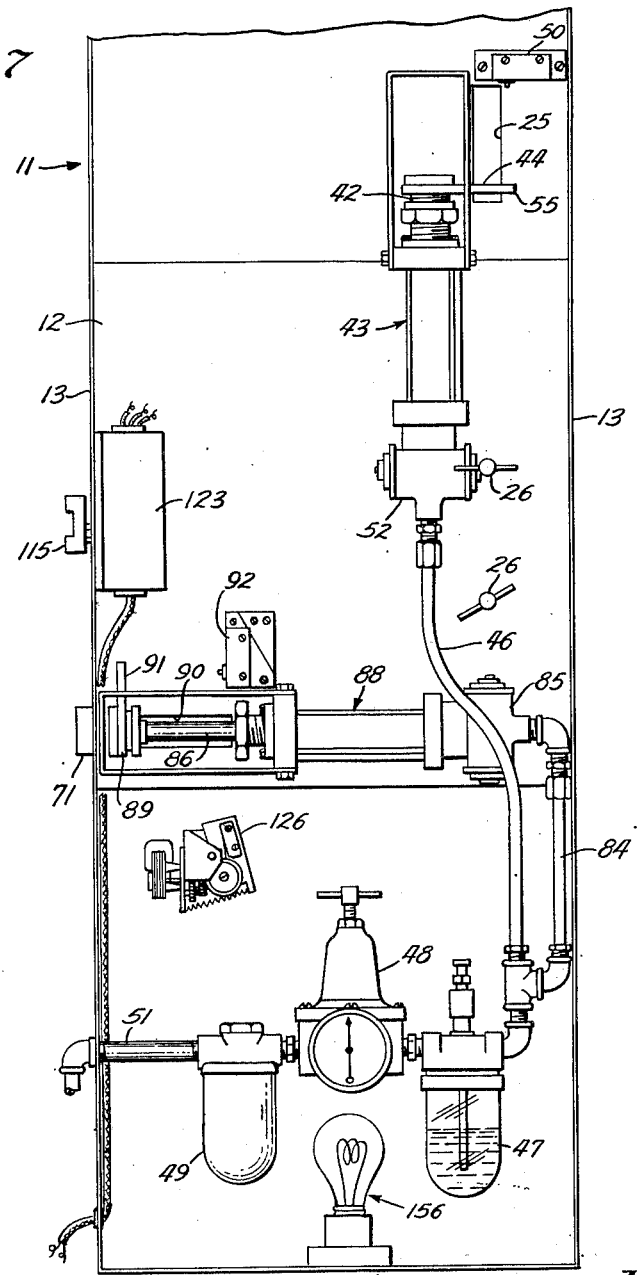

May 26, 1953     S. F. ANDERSON     2,639,677
SANDWICH MACHINE
Filed Dec. 27, 1949     4 Sheets-Sheet 4
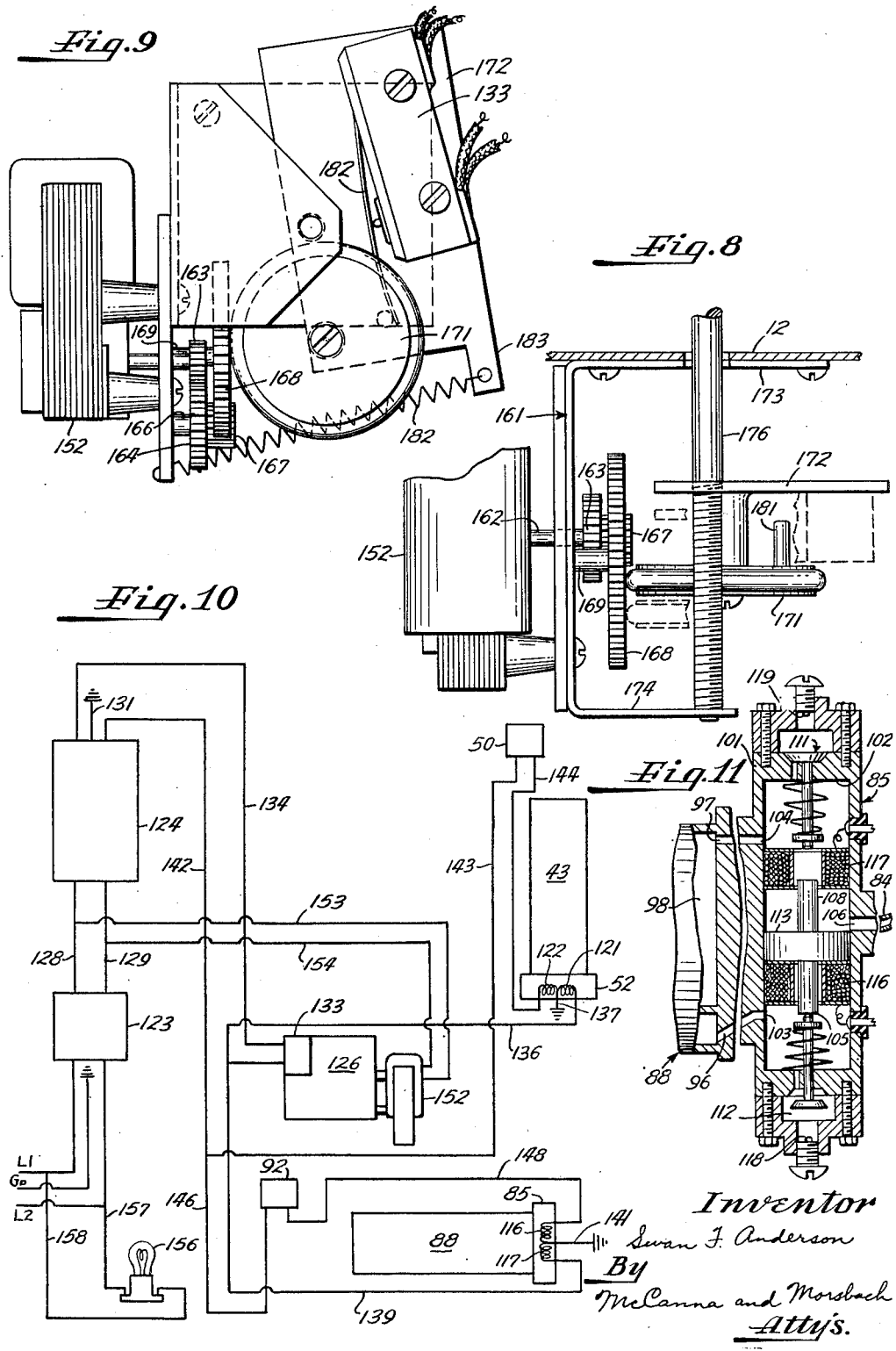
Inventor
Swan F. Anderson
By McCanna and Morsbach
Atty's.

Patented May 26, 1953

2,639,677

UNITED STATES PATENT OFFICE 2,639,677

SANDWICH MACHINE

Swan F. Anderson, Rockford, Ill., assignor of one-half to himself and one-half to Ralph F. Anderson, both of Rockford, Ill.

Application December 27, 1949, Serial No. 135,134

17 Claims. (Cl. 107—1)

This invention relates to machines for making sandwiches of ice cream and the like.

Ice cream sandwiches of the type comprising a layer of ice cream disposed between two wafers have become a popular confection. In some instances such sandwiches are made manually at the time of purchase and are apt to be unsanitary because of manual handling of the ingredients. Even when made at a central plant the operation has heretofore involved considerable handling of the wafers. Furthermore the cost of making them has been comparatively expensive.

An object of this invention is the provision of a machine for forming ice cream sandwiches and the like in a sanitary manner, at a relatively high rate of production and at a relatively low cost.

Another object of the invention is the provision of a sandwich making machine wherein the components may be readily assembled and disassembled for effective cleaning.

A further object of the invention is the provision of a sandwich machine wherein the wafers or other outer members of the sandwich are mechanically applied to the opposite sides of a flowing stream web of filler material as the material emerges from the nozzle and the stream is severed by ejection of the sandwich across the end of the nozzle.

Another object of the invention is the provision of a sandwich making machine of the above character having novel means for feeding wafers along preselected paths.

A still further object is the provision of a sandwich machine having novel feeding means for the filler material and the outer members to form sandwiches at a relatively high rate of speed and novel means for ejecting the finished sandwiches and delivering the same to a point of disposal.

Another object of the invention is the provision of a sandwich making machine having novel means for supporting the wafers during the formation of the sandwich.

Another object of the invention is the provision of a sandwich making machine which is efficient, rugged, requires a minimum of maintenance, and is relatively inexpensive to produce.

Another object of the invention is the provision of a sandwich making machine having novel means for coordinating movements of the component parts of the machine.

Other objects and advantages of the invention will become apparent from the following detailed description taken in connection with the accompanying drawings, in which—

Figure 1 is a fragmentary front elevational view of a sandwich making machine embodying the present invention;

Fig. 2 is a side view of a machine shown in Figure 1;

Fig. 3 is an enlarged fragmentary perspective view showing the means for supporting the sandwich during formation;

Fig. 4 is a sectional view taken substantially along the line 4—4 of Figure 1 showing the nozzle mounting;

Fig. 5 is an enlarged fragmentary view similar to Figure 1 showing a sandwich being ejected from the machine;

Fig. 6 is a view similar to Figure 1 showing the relation of the parts at the start of the formation of a sandwich;

Fig. 7 is a back view of the machine;

Fig. 8 is a top view of the timer mechanism employed in the machine;

Fig. 9 is a side view of the timer mechanism;

Fig. 10 is an electric circuit diagram, and

Fig. 11 is a diagrammatic view of a solenoid valve employed in operating the feeding and ejecting mechanisms.

While the particular machine chosen for illustrating the invention is utilized for making ice cream sandwiches comprising spaced wafers having a layer or filler of ice cream therebetween, it is to be understood that this machine may also be used with other types of plastic comestibles. In general the machine comprises means for discharging a sandwich filler along a preselected path, means for simultaneously feeding cookies or the like hereinafter referred to collectively as wafers, along paths on opposite sides of the filler and into contact with the sides thereof to form a sandwich, and ejecting means for ejecting the formed sandwich and conveying the same to a point of disposal.

As best seen in Figures 1, 2 and 7, the machine of the embodiment illustrated includes a support in the form of a cabinet or housing 11 having a front panel 12, a removable back, not shown, and side panels 13. A nozzle 14 (see Figs. 1, 2 and 4) formed by spaced side members 16 and 17 interconnected at their edges around the periphery as indicated at 18 and 19, is mounted on the front 12 of the cabinet 11. The lower or discharge end 20 of the nozzle is open and defines a generally rectangular shaped opening through which ice cream in a plastic state may flow under pressure in a continuous ribbon-like stream or web. At its upper end the nozzle is formed with a ported boss 21 for connection with a suitable conduit 22 leading to a supply of ice cream in semiliquid or plastic condition, such as emitted from a conventional freezer or filler. The nozzle 14 is secured to the cabinet 11 as by spaced stud bolts 23, rigidly attached to the edge 18 of the nozzle and extending through apertures 24 in the front panel, and wing nuts 26 disposed at the back of the panel and threaded on to the stud bolts. Shouldered portions 27 on the stud bolts 23 space the nozzle 14 outwardly from the front of the cabinet.

Wafer magazines 28 are mounted on the front of the cabinet adjacent the sides 16 and 17 of the nozzle 14. As best seen in Figs. 1, 5 and 6 each magazine comprises a generally U-shaped channel member having a bottom substantially the width of the wafer and upturned edge flanges 29. Brackets 31 bolted to the front panel 12 secure the magazines 28 to the cabinet in an inclined manner so that the extreme lower ends of the magazines are spaced from the sides 16 and 17 of the nozzle 14 a distance slightly greater than the thickness of the wafers to define discharge openings 32 (Fig. 6). An inclined baffle 33 spaced above the bottom of each magazine 28 serves as a guide to insure that the wafers rest against the bottom of the magazine with their upper edges in substantially coplanar relationship as they approach the end of the magazine.

The wafers are fed from the magazines 28 by feed plates 34 which ride along the sides 16 and 17 of the nozzle 14 and reciprocate in a direction parallel therewith. The plates 34 are generally L-shaped as shown by dotted lines in Fig. 2, comprising a stem 35 and a toe portion 36. The toe portion 36 of each plate 34 is of substantially the same thickness as the wafers so that when brought into engagement with the upper edge of the wafers as the plates move down, the wafers are fed through the openings 32 to positions below the nozzle 14. The stem portion 35 of each plate 34 is received in a slot 40 formed on a boss 45 (see Fig. 5) at the lower end of a slide 38. A removable pin 37 extending through the boss 45 and both plates 34 secures the plates to the slide. The slide 38 is supported on suitable ways by gibs 41 for vertical reciprocation.

While the slide 38 may be reciprocated by a number of different mechanisms, in the present embodiment it is connected to a piston rod 42 (see Fig. 7) of a conventional air motor 43, a suitable air motor being on the market as "The Bellows Air Motor" made by The Bellows Company of Akron, Ohio. The air motor 43 is mounted on the back of the front panel 12 and is connected to the piston rod 42 by an arm 44 extending through an opening 25 formed in the front panel 12. The air motor unit 43 is connected to an air supply through a conduit 46, an oil filter 47, a pressure regulator 48, a moisture filter 49 and a conduit 51. An electrically operated solenoid valve 52 between the air motor unit 43 and the conduit 46 controls the flow of fluid to the air motor unit 43 in a conventional manner to effect reciprocal movement of the piston rod 42 to move the feed plates 34 between a retracted position as shown in Fig. 5 and an ejecting position as shown in Figure 1. A limit switch 50 mounted on the back of the front panel 12 is positioned to be engaged by an ear 55 forming a part of the arm 44 for a purpose to be described hereinafter when the wafer feed plates 34 are in their retracted position.

Provision is made for supporting the formed sandwiches below the nozzle 14. To this end plates 53 and 54 (see Fig. 3) are associated with the nozzle and have their extreme lower ends flanged inwardly to define spaced sandwich support rails 56 and 57 directly below the edges of the discharge opening of the nozzle 14. The rails 56 and 57 are spaced sufficiently below the end of the nozzle to permit the formed sandwiches to be moved relative to the nozzle 14. The plate 53 is secured to the front 12 and the plate 54 is bolted to the nozzle 14 by capscrews 30.

The formed sandwiches are held in an upright position beneath the nozzle 14 by spaced resilient members 58. In this embodiment of the invention these are formed by holding a central portion 61 of a piece of rubber in recesses formed in the plates 53 and 54 so that opposite ends of the piece of rubber extend inwardly of the face of the plates to define the members 58, by a removable clip 59. The resiliency of the members 58 is such that a slight pressure is exerted on the ends of the wafers to prevent the wafers from tipping over.

An ejector plate 66 is provided for moving the formed sandwiches from their position below the nozzle 14 to a sandwich receiving station 64 for disposal. The ejector is positioned for engagement with the face of the sandwich when the latter is supported on the rails 56 and 57 to move the sandwich therealong. Extending rearwardly of the ejector are spaced rods 67 (one only being shown), rigidly attached to a transversely extending yoke 68 pivotally mounted on a bearing pin 69 (Fig. 2) extending outwardly from a slide 71, the latter being movable along horizontal ways and held in a position by gibs 72. A bracket 73 attached to the slide 71 supports the outer end of the bearing pin 69. A torsion spring 74 acts between the yoke 68 and the bracket 73 to maintain the plate 66 in a generally vertical position as shown in Figure 1. One of the rods 67 indicated at 70 extends rearwardly of, or to the right of, the yoke 68 as shown in Figures 1, 5 and 6 and has a laterally extending end portion to define a follower 76 engageable with a cam 77 to guide the plate 66 as indicated in Fig. 6 as it moves between the position of Fig. 5 and that of Figure 1. The cam 77 is pivotally mounted on the top gib 72 by a pin 78 and is prevented from swinging downward from the position of Fig. 5 by a pin 79 engageable against the top of the gib. The cam as best seen in Fig. 5 has a flat top edge 81, a rear edge 82, a bottom edge 83 and a forward edge 84. The rear edge inclines slightly from the top edge to the bottom edge 83, the bottom edge 83 inclines away from the top edge with the inclination being greater adjacent the forward edge 84, and the forward edge 84 inclines rearwardly from the bottom edge 83 to the top edge 81.

The slide 71 is connected to a piston rod 86 of an air motor 88, mounted on the back of the front panel 12, through a suitable arm 89 extending through a slot 90. The air motor 88 is positioned so that the piston rod 86 reciprocates in a horizontal direction to move the plate 66 between its retracted and extended positions shown in Figs. 1 and 5 respectively and is connected to the air supply 51 as by a conduit 84. A control valve 85 controls the flow of air to the air motor 88. An ear 91 on the arm 89 is shaped to engage a plunger on a limit switch 92 mounted on the back of the front panel 12 when the pusher 66 is in the ejecting position, for a purpose to be described hereinafter.

For the purpose of simplifying the drawings the solenoid valve 85 is shown diagrammatically in Fig. 11 and the principle of operation of the "Bellows Air Motor" is described so that the flow paths of fluid through the valve may be readily visualized. The valve includes a casing 101 having a chamber 102 formed therein, ports 103 and 104 connected with the pasageways 96 and 97 respectively and a port 106 in communication with the air supply conduit 51 through the conduit 84. Disposed in the chamber 102 is a valve element 113 movable between opposed positions. At opposite ends of the casing 101 are spring biased valves 111 and 112 normally urged to closed positions and movable to an open position to effect communication between the chamber 102 and atmosphere upon engagement of the valve element 113 with shaft portions on the valves 111 and 112 in each of the positions of the valve element 113. The movement of the valve element 113 is controlled by solenoid coils 116 and 117. When the coil 116 is energized the valve element 113 is moved to assume the position shown in Fig. 11. In this position the element 113 closes the opening in the coil 116 shaped to receive an axially extending projection 105. Thus air flows from the port 106 through the opening in the coil 117 shaped to receive an axially extending projection 108 on the element 113 to the port 104 to the passageway 97 to the back end of a chamber 98 formed in the unit 88 and air at the opposite end of the chamber 98 is discharged through the passageway 96, the port 103 and the spring biased valve 112, the opening which is controlled by the valve element 113 and the adjustable orifice 118. When the coil 117 is energized the valve element 113 moves to assume a position opposite that shown in Fig. 11 so that the element 113 closes the opening in the coil 117. Thus air may flow from the port 106 through the opening in the coil 116 to the port 103, into the passageway 96 to one end of the chamber 98 and the air at the opposite end of the chamber may be discharged from the chamber 98 through the passageway 97, the port 104 and the spring biased valve port 111, the opening of which is under the control of the valve element 113 and the adjustable orifice 119. The control valve 52 is of identical construction including solenoid coils 121 and 122 (see Fig. 10) and operates in the same way as the valve 85.

The electric circuit for the sandwich making machine is shown in Fig. 10 and the locations of the various elements are shown in Fig. 7. The circuit includes a main switch 123, a transformer 124, a timer 126, the limit switches 50 and 92 and the electrically operated control valves 52 and 85. As shown the main switch 123 is mounted on a side 13 of the cabinet 11 and is actuated by an actuator 115 (see Fig. 2) accessible from the exterior of the cabinet. As shown in Fig. 10 the main switch 123 is connected to power lines L1 and L2 and is connected to the high voltage side of the transformer through conductors 128 and 129. A mid-tap on the low voltage side of the transformer is grounded as by a conductor 131. One side of the low voltage winding of the transformer is connected to a normally open switch 133 on the timer 126 by a conductor 134. The opposite side of the normally open switch is connected to a coil 121 of the solenoid operated valve 52 through a conductor 136. The opposite side of the coil 121 is connected to ground through a conductor 137. The opposite side of the normally open switch 133 is also connected to one side of the coil 117 of the solenoid operated valve 85 by a conductor 139. The opposite side of the coil 97 is connected to ground by a conductor 141. The other side of the low voltage winding of the transformer is connected to the normally open limit switch 50 through conductors 142 and 143. The switch 50 is also connected to one side of the coil 122 of the solenoid operated valve 52 by a conductor 144. The other side of the low voltage winding of the transformer 124 is also connected to the normally open limit switch 92 by the conductors 142 and 146. The normally open switch 92 is in turn connected to the coil 116 on the solenoid valve 85 by a conductor 148. A motor 152 of the timer 126 is connected to the conductors 128 and 129 by conductors 153 and 154. A light 156 is connected across the lines L1 and L2 as by conductors 157 and 158, and is for the purpose of providing heat in the cabinet 11 to prevent the formation of condensation therein.

The timer 126, which initiates the cycle of operation, is best shown in Figs. 8 and 9 and includes a frame 161 supported on the back of the front 12 of the cabinet 11. The motor 152 is mounted on one side of the frame 161 and is provided with a drive shaft 162 extending through an opening in the frame. A pinion gear 163 is mounted on the drive shaft 162 to mesh with a spur gear 164 mounted on a shaft 166. The spur gear 164 is directly connected to a pinion 167 shaped to mesh with a spur gear 168 mounted on a bearing pin 169. At right angles to the face of the gear 168 is a friction wheel 171 mounted on a plate 172 disposed between opposed legs 173 and 174 of the frame. The plate 172 is threadably supported on an adjustable bolt 176 supported at opposite ends by the legs of the frame 161 so as to be substantially at right angles to the drive shaft 162. Rotating the adjustment bolt 176 as by a knob 178 (see Figure 1) accessible from the front of the cabinet, changes the relative position of the friction wheel 171 with respect to the face of the gear 168 (see dotted line position of wheel shown in Fig. 8) so that the speed of the friction wheel 171 may be varied. A pin 181 extends outwardly from one side of the friction wheel 171 to engage an actuator 182 of the switch 133 mounted on the plate 172. A spring 182 acts between an ear 183 and the frame 161 to urge the friction wheel 171 into frictional engagement with the face of the gear 168.

*Operation*

It is assumed that the flow of ice cream or other material from the nozzle 14 has been adjusted so that a continuous ribbon-like stream is being continuously discharged from the end of the nozzle and that the parts are in the position shown in Fig. 5.

When the main switch 123 is closed the motor 152 is also energized by power flowing through conductors 153 and 154 to effect rotation of the gear 168 to drive the friction wheel 171 and cause the pin 181 to momentarily engage the actuator 182 to close switch 133 once each time the wheel 171 goes through one complete revolution. As soon as the switch 133 closes, power flows to the coil 117 of the solenoid valve 85 through the conductors 134 and 139 to ground through the conductor 141. Simultaneously the coil 121 of the solenoid valve 52 is energized through the circuit comprising conductor 134, the conductor 136, the coil 121, the conductor 137 and ground. When the coil 117 is energized the valve element 113 of the valve 85 is shifted to the position shown in Figure 11 so that the air from the supply line 84 enters the chamber 98 of the air motor unit 88 through the port 104 and the passageway 97 and air at the opposite end of the chamber 98 exhausts to atmosphere through the passageway 96, the port 103, the exhaust valve 112 and the adjustable orifice 118. The piston rod 86 of the air motor unit 88 is moved to the position shown in Fig. 7 and the slide 71 and the ejector 66 are moved horizontally to their extended position shown in Fig. 5 from the position shown in Figure 1. During this horizontal movement the ejector 66 engages the sandwich formed below the nozzle 14 and urges the sandwich along the rails 56 and 57 to the sandwich receiving station 64 and shears the layer of filler from the stream on the lower edge of the nozzle. During the formation of the sandwich the resilient members 58 engage opposite ends of the sandwich as best shown in Fig. 3 and support the latter in endwise relation so as to be in position to be engaged by the ejector 66. Also during this movement the follower 76 engages the bottom edge 83 of the cam 77 and effects rotation thereof about the pin 78 so that the follower 76 raises the cam to permit passage of the follower thereunder without deflecting the ejector, it being understood that as soon as the follower clears the bottom edge 83 of the cam 77 the cam returns to position shown in Fig. 5 by gravity. When the ejector 66 reaches its extended position shown in Fig. 5 the ear 91 again engages the plunger on the limit switch 92 to close the latter and effect return movement of the ejector.

Concurrently with the energization of the coil 121 of valve 85 the coil 172 in the valve 52 is energized so that the valve element therein is positioned to cause the piston rod 42 and in turn the plates 34 to move from their extended position in Figure 1 to their retracted position shown in Fig. 5. During the upward movement of the plates 34 the guides 33 serve to retain the wafers in the magazines which press against the sides of the plates 34. When the feed plates 34 reach their retracted position as shown in Fig. 5 the ear 55 engages the plunger on the switch 50 to close the latter.

As soon as the switch 50 closes the coil 122 in the solenoid valve 52 is energized through a circuit which may be traced from the transformer 124 through the conductor 142, the conductor 143, the limit switch 50, the conductor 144, the coil 122, the conductor 137 to ground. This moves the valve element 113 of valve 52 to establish communication from air line 46 to the upper side of the piston in motor 43 and between the lower side of the piston and atmosphere. The adjustable orifice in the latter communication is adjusted to allow the air to exhaust at a rate to produce a suitable rate of movement of the piston 42 and slide 41 to move the wafers rapidly downwardly into seated position against the rams 56 and 57. Under these conditions air enters the air motor 43 to cause the piston 42 and the slide 41 to move downwardly, and thereby move the plates 34 to eject wafers from the magazines 28 through the discharge openings 32 along paths on opposite sides of the stream of ice cream being discharged from the nozzle 14. It is to be understood that the ice cream upon being discharged from the nozzle 14 expands sufficiently to effect adhesive contact with the wafers as they are being fed axially of the nozzle. As the ice cream continues to flow from the nozzle the space between the ejected wafers fills. The timer is adjusted to start a new cycle when the space is substantially filled, the interval depending upon the rate of flow from the nozzle.

When the limit switch 92 is closed, the coil 116 on the solenoid valve 88 is also energized through the circuit comprising the conductor 142, the conductor 146, the limit switch 92, the conductor 148, the coil 116, the conductor 141 to ground. As a result the valve element 113 is shifted to a position so that air enters the chamber 98 through the port 103, the passageway 96 and exhaust air flows from the chamber 98 through the passageway 97, the port 104, the exhaust valve 111 and the adjustable orifice 119. The piston rod 86 and slide move to the left to the position shown in Fig. 7 so that the ejector 66 is thus caused to move from its extended position shown in Figure 5 to its retracted position shown in Figure 1. During the initial part of this movement of the ejector 66, the follower 76 engages the forward edge 84 of the cam 77 (see Fig. 6) and causes the ejector to be deflected away from the opening of the nozzle 14 in coordinated relation with the advance of the wafers and layer of filler therebetween so that the ejector 66 does not interfere with the formation of a sandwich as it is moved to its retracted posiion. The follower 76 successively engages the top edge 81, and the back edge 82 of the cam as the slide 71 moves to the right as shown in Fig. 7 so as to return the ejector to its retracted position shown in Figure 1.

As soon as the slide 38 moves away from its upper position to feed wafers from the magazines 28, the limit switch 50 moves to its open position thereby de-energizing the circuit to the coil 122. Also as soon as the slide 71 moves to move the ejector 66 from its extended to its retracted position the limit switch 92 opens to de-energize the circuit to the coil 116. However, in both instances the air pressure against valve element 113 retains the valve in its adjusted position until the opposed coil is energized.

The adjustable exhaust orifices 118 and 119 on the valves are adjusted to provide for slow feed and rapid return movement of the ejector 66. The speed of operation of the sandwich machine may be varied by adjusting the position of the friction wheel 171 with respect to the face of the gear 168 through the knob 178 accessible from the front of the cabinet. The machine remains in operation until the switch 123 is opened.

The aforegoing construction has many advantages. For example, the nozzle 14 may be easily assembled and disassembled from the cabinet. To disassemble the nozzle from the cabinet, the wing nuts 26 are manually moved from the stud bolts 23. The nozzle 14 may be removed as a unit from the front 12 of the cabinet 11. Removal of the nozzle 14 also effects removal of the rail 57 and resilient supports 58 engageable with one of the ends of the formed sandwich. This allows the operator of the machine to thoroughly clean the nozzle and the front of the machine. The resilient members 58 may be readily removed from the machine since they are supported thereon by clips. The timer and the adjustable orifice provide means for controlling the speed of operation of the unit. This machine may be readily formed and all components are readily accessible. The machine also insures that sandwiches may be formed in a clean sanitary manner.

I claim:

1. In a machine for forming a succession of sandwiches, means for continuously advancing a ribbon-like web of plastic comestible, means for advancing wafers of approximately web width into face-to-face relationship on opposite sides of said web and means for concurrently operating said wafer-advancing means in timed relationship with the rate of flow of said web.

2. In a sandwich making machine, means for continuously advancing a ribbon-like web of plastic comestible to a preselected position, means for feeding wafers against opposite sides of the web into face-to-face relationship while the web is advancing, the wafers having a dimension crosswise of the web at least as great as that of the web, and means for severing the formed sandwich from the web.

3. In a sandwich forming machine, a nozzle for continuously extruding a ribbon-like web of plastic comestible into a sandwich forming station, means for feeding successive pairs of wafers longitudinally of the nozzle along opposite sides of the advancing web into face-to-face relation at said forming station and means for retaining the wafers in the forming station for the space therebetween to be filled with said comestible.

4. In a sandwich forming machine a nozzle having a mouth shaped to form a ribbon-like web from plastic comestible supplied thereto under pressure, wafer magazines for holding wafers of approximately web width, means for successively feeding wafers simultaneously one from each magazine to positions adjacent the mouth and on opposite sides of the web and means for severing the formed sandwich from the web.

5. In a sandwich forming machine a nozzle having a mouth shaped to discharge a ribbon-like web of plastic comestible supplied thereto under pressure, wafer magazines for holding wafers of approximately web width, means for successively feeding wafers simultaneously one from each magazine to positions adjacent the mouth and on opposite sides of the advancing web, and means for moving the formed sandwich in a direction to bring an edge of one wafer across the mouth of the nozzle and sever the web.

6. In a sandwich forming machine, a nozzle having a mouth shaped to discharge a continuous ribbon-like web of plastic comestible supplied thereto under pressure, wafer magazines on opposite sides of the nozzle for holding wafers of approximately web width having wafer discharge openings at opposite sides of the nozzle, means for simultaneously feeding wafers through each of the discharge openings in succession along opposite sides of the nozzle to spaced positions beyond the mouth for the reception of the web therebetween, and means for successively discharging the sandwiches as formed in a direction to bring an edge of one wafer across the mouth of the nozzle and sever the web.

7. The combination of claim 5 including means for retaining the wafers in approximately parallel relationship beyond the mouth and during discharge movement of the sandwich.

8. The combination of claim 6 including means for alternately operating the wafer feeding means and the sandwich discharging means in timed relationship.

9. In a sandwich forming machine, a nozzle having a downwardly opening mouth shaped to discharge a continuous ribbon-like web of plastic comestible supplied thereto under pressure, wafer magazines on opposite sides of the nozzle for holding wafers of approximately web width and having wafer discharge openings at opposite sides of the nozzle, means for simultaneously feeding wafers through each of the discharge openings along opposite sides of the nozzle and advancing web to spaced positions beyond the mouth for the reception of the advancing web therebetween, means for successively severing the formed sandwiches from the web and discharging the same as formed, spaced rails below the nozzle disposed for engagement by the wafers to support the sandwich at the mouth of the nozzle and resilient means engageable with the edge of the sandwich to retain the sandwich in upright position while being formed and discharged.

10. In a sandwich forming machine a nozzle having flat opposed sides and connecting edge portions defining a narrow donwardly opening mouth shaped to discharge a continuous ribbon-like web of plastic comestible supplied thereto under pressure, wafer magazines on each side of the nozzle comprising slideways sloping downwardly toward the nozzle for supporting stacks of wafers, on edge in face-to-face relationship with the lowermost wafer of the stacks resting against said flat opposed sides of the nozzle, the slideways having feed openings for the passage of the lowermost wafer, a feeder plate disposed against the flat sides of the nozzle reciprocable in unison longitudinally of the nozzle to engage the upper edges of the lowermost wafer in each magazine and move them through the feed opening to spaced positions beyond the mouth during the advance of the web, means for supporting the wafers at the mouth while the web advances to fill the space between the wafers and means for moving the sandwich across the mouth of the nozzle to sever the web and discharge the sandwich.

11. The combination of claim 2 wherein the last-mentioned means includes an ejector movable between opposed positions on opposite sides of the path of the web and engageable with the side face of one of the wafers, and means for moving said ejector to move the sandwich crosswise of the path of the web to shear the web at the mouth of the nozzle.

12. The combination of claim 5 wherein the last-mentioned means includes an ejector, means for moving said ejector between a retracted and an extended position on opposite sides of the path of the web and means for guiding the ejector crosswise of the nozzle into engagement with the sandwich to discharge the same as the ejector moves from said retracted to said extended position and for guiding the ejector crosswise and axially of the nozzle out of the path of the wafers as the ejector returns to said retracted position for formation of a subsequent sandwich during return movement of the ejector.

13. In a sandwich making machine, a support, a nozzle mounted on the support having a downwardly opening mouth shaped to deliver a ribbon-like web of plastic comestible supplied thereto under pressure, wafer storage magazines on opposite sides of the nozzle, feed plates reciprocable to simultaneously feed a wafer from each of said magazines along the sides of the nozzle and advancing web to a forming station beyond the end of said nozzle, a plate slide for mounting said plates, ways on said support for said slide, means for reciprocating said slide to move the plates in feeding and return movement, an ejector spaced from the end of said nozzle and movable transversely thereof between a retracted and an extended position on opposite sides of the nozzle, a movable ejector slide, means for pivotally mounting said ejector on said ejector slide, ways on said support for said ejector slide, means for reciprocating said ejector slide to move said ejector between said retracted and extended positions on opposite sides of said station and cam means acting between said support and said ejector for guiding said ejector from the retracted position into contact with the sandwich at said station and thence to said extended position to discharge the sandwich and for initially deflecting the ejector axially away from the end of the nozzle as the ejector moves transversely of the nozzle in moving from its extended to the retracted position to clear the space below the nozzle.

14. The combination of claim 13 having control means for controlling the frequency and the order of reciprocation of said plate slide and said ejector slide.

15. In a sandwich making machine, a support, a nozzle mounted on the support having a downwardly opening mouth shaped to deliver a ribbon-like web of plastic comestible supplied thereto under pressure for delivering along a preselected vertical path, inclined wafer storage magazines on opposite sides of the nozzle, wafer feed plates associated with said magazines to simultaneously feed a wafer from each of said magazines downwardly along the sides of the advancing web to a forming station below said nozzle, a vertically movable slide for mounting said plates, reciprocable means for moving said slide to move the plates, an ejector below said nozzle movable transaxially thereof from a retracted to an extended position on opposite sides of the path of said web to engage and discharge a formed sandwich from said forming station, a horizontally movable slide, means for pivotally mounting said ejector on said horizontally movable slide, reciprocable means for moving said horizontally movable slide to move said ejector between said retracted and an extended position, and means for controlling the speed of movement of said slides.

16. In a sandwich making machine, a support, means for continuously advancing a ribbon-like web of plastic comestible along a preselected vertical path, a wafer magazine on each side of said path, wafer feed means for simultaneously feeding a wafer from each of said magazines into engagement with said web on opposite sides thereof, pressure fluid means for actuating said feed means to eject wafers from the magazines, sandwich ejector means and pressure fluid means for moving said ejector means transversely of the path of the web between a retracted and an extended position for severing the formed sandwich from the web.

17. In a sandwich making machine, means for feeding a continuous ribbon-like web of plastic comestible along a preselected path, means for simultaneously feeding wafers on opposite sides of said web at a preselected rate of speed to engage said web on opposite sides thereof in face-to-face relation, means for adjusting said rate of speed, and means for moving the formed sandwich crosswise of the web to sever and discharge the sandwich.

SWAN F. ANDERSON.

References Cited in the file of this patent

UNITED STATES PATENTS

| Number | Name | Date |
|---|---|---|
| 1,585,114 | Rondolin | May 18, 1926 |
| 1,755,699 | Loehr | Apr. 22, 1930 |
| 1,798,560 | Saetta | Mar. 31, 1931 |
| 2,136,505 | Hirschson | Nov. 15, 1938 |
| 2,521,213 | Gentry | Sept. 5, 1950 |

FOREIGN PATENTS

| Number | Country | Date |
|---|---|---|
| 291,811 | Germany | May 10, 1916 |